April 17, 1934.   A. KURNICK   1,955,300
CAMERA GUN
Filed Feb. 27, 1933
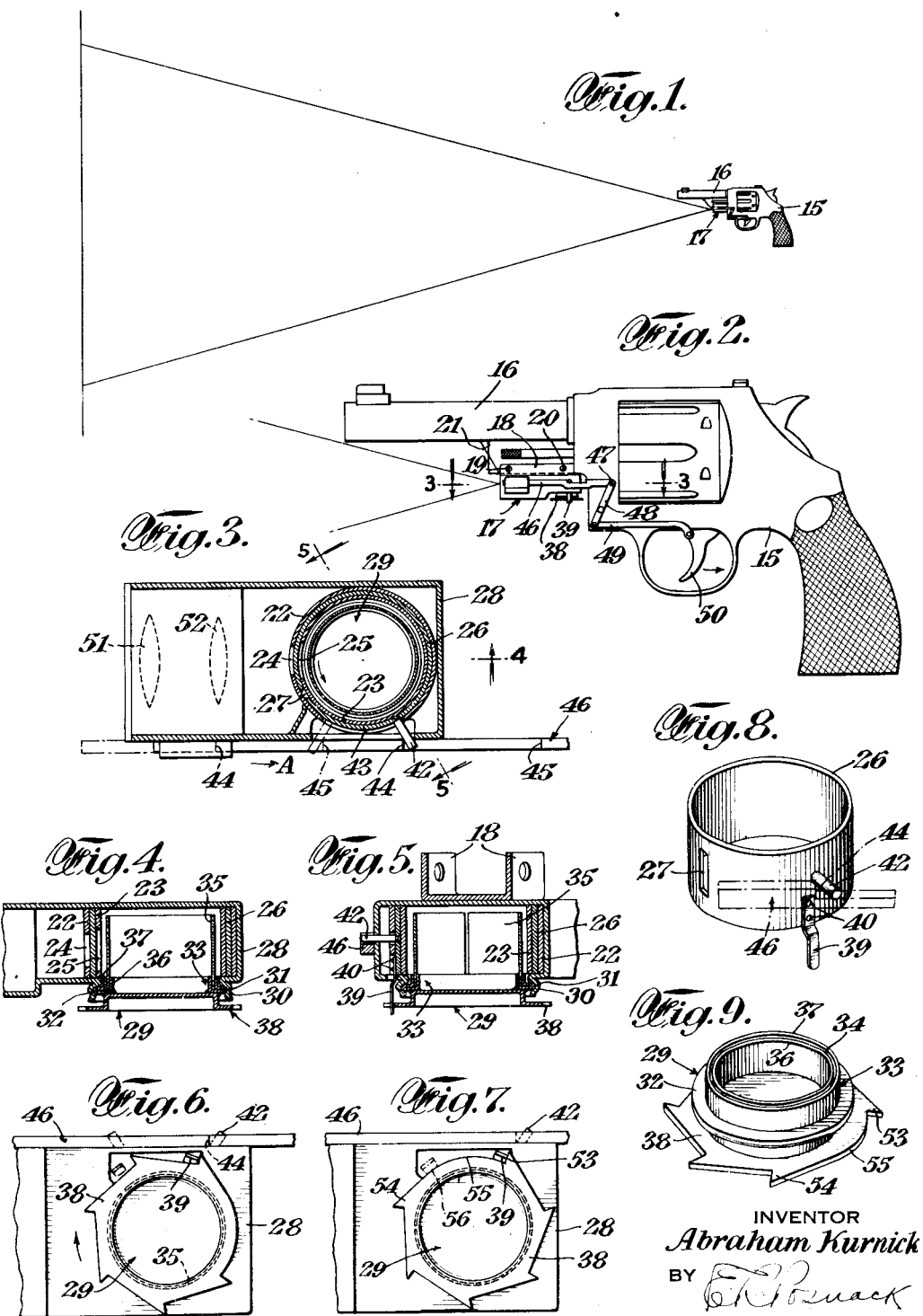
INVENTOR
Abraham Kurnick
BY 
ATTORNEY

Patented Apr. 17, 1934

1,955,300

UNITED STATES PATENT OFFICE 1,955,300

CAMERA GUN

Abraham Kurnick, Brooklyn, N. Y., assignor of one-half to May Mackler, Brooklyn, N. Y.

Application February 27, 1933, Serial No. 658,678

12 Claims. (Cl. 95—12)

This invention relates to a camera gun of the type having a photographic attachment co-operatively connected with the trigger the operation of which both discharges the gun and actuates the camera to take a photograph of the target.

My invention has for one of its primary purposes to provide guns, pistols and revolvers with means of obtaining photographic evidence which is not otherwise procurable, as is frequently the case in the course of the performance of police duties. It is one of the objects of this invention to present a device associated with a gun in such a way as not to be an impediment in the use thereof, and to occupy a minimum of space so as not to constitute an obstruction either during the operation of the weapon or when lodged in a holster or pocket. It is another object of this invention to enable the use of such a device with a revolver whereby upon each successive discharge the film will be correspondingly advanced for effecting successive exposures. Another object of my invention is to eliminate such frictional resistance during the operation of the constituent parts of a device of this nature as might tend to affect the ease of operation of the weapon. Still another object is to permit of ready and easy loading of films within the camera. And still another object of my invention is to automatically terminate the process of advancing the film beyond a predetermined point.

Other objects, features and advantages will appear from the drawing and the description hereinafter given.

Referring to the drawing,

Figure 1 is a view of a gun provided with the camera constituting part of my invention, showing the angle of photographic vision which it is possible to obtain therewith.

Figure 2 is a side view of my invention showing the relative position of the parts.

Figure 3 is a horizontal section taken along line 3—3 of Figure 2, illustrating the shutter and associated mechanism in both their normal and projected positions.

Figure 4 is a fragmentary section along line 4—4 of Figure 3.

Figure 5 is a diagonal section taken along line 5—5 of Figure 3.

Figure 6 is a view of the ratchet construction constituting part of the film container, showing the actuating member in its original and projected positions.

Figure 7 is a view similar to Figure 6, illustrating the positions of the actuating member after the last section of film has been exposed.

Figure 8 is a perspective view of the cylindrical shutter showing by dot-dash lines the position of the actuating link, and Figure 9 is a perspective view of the film carrying member.

In the drawing, the gun 15 has secured thereto underneath the muzzle 16 thereof the camera 17, the attachment being effected, in the form illustrated in the drawing, by securing the channel member 18, with screws 19 and 20, to the webb 21 of the gun.

Two stationary concentric cylinders 22 and 23, in spaced relation, contain therein the apertures 24 and 25 respectively, in registry with each other. Slidably movable between said cylinders is the cylindrical shutter 26 containing the opening 27. The camera casing 28 contains on the underside thereof an opening adapted to receive the film-carrying member 29, the peripheral wall 30 of said opening being of yieldable material and containing an annular recess 31 therein adapted to yieldably hold the circular flange 32 of the film holder 33 in place.

The cylindrical film holder 33 contains at the terminal edge thereof a circular groove 34, which extends into the wall of said cylinder and is adapted to receive the cylindrical film 35. It should be noted that in the construction illustrated the film holder 33 is of sheet metal construction, the two end portions thereof 36 and 37 forming the groove 34, the remaining portion thereof being bent, shaped and folded back upon itself so as to constitute the body of the member 33 and the flange 32. Affixed to the cylinder 33 is the ratchet wheel 38 with the teeth of which the spring member 39 is cooperatively engageable,—this member being suitably attached to the cylindrical shutter 26 at 40.

The pin 42 is secured to the shutter 26 and is movable within the slot 43 of the exterior cylindrical casing 22. Engageable with said pin are the abutments or walls 44 and 45 of the link 46 attached at 47 to the lever 48 which is in turn pivotally connected to the actuating link 49 pivotally attached to the trigger 50.

In operating this device, the trigger 50 is manipulated in the direction of the arrow, causing thereby a forward movement of the link 46. This movement results in the operative engagement of the abutment 45 with the pin 42, to carry said pin forwardly within the slot 43, thereby causing the shutter 26 to rotate in a clockwise direction (Figure 3) and causing the aperture 27 to move past the apertures 24 and 25. At the instant when said shutter aperture is in registry with the said apertures 24 and 25, the film 35 becomes exposed, and the image of the target projected through lenses 51 and 52 will register itself thereon.

The trigger, upon its release, will be carried forward by the spring-actuated mechanism within the gun, thereby causing a movement of the link 46 in the direction of the arrow A (Figure 3), whereby the abutment 44 of the link 46 will engage the pin 42 and cause a return of the shutter 26 to its starting position. Upon the return movement of the shutter, the actuating member 39 engages a tooth on the ratchet wheel 38 and causes the film holder 33 to rotate in the direction of the arrow (Figure 6), thereby advancing the film the distance of one picture. It should be noted that inasmuch as the element 39 is made of spring material, it will slidably and yieldably move over the teeth of the ratchet during the forward or picture-taking movement of the shutter 26, and will only, upon a return of the shutter, actuate the film container. After this operation has been completed, successive pulls of the trigger will produce the same relative movements of the parts as hereinbefore described, causing a new picture to be taken on the new exposed portion of the film for each shot.

In the preferred form of my invention, there are as many teeth on the ratchet as there are bullet compartments in the rotary cylinder of the gun, so that there can only be six forward movements of the film after each shot for the gun illustrated. I provide however, after the last tooth 53, a relatively large space between said tooth and the first tooth 54, the surface 55 of the ratchet between said teeth being arcuate. It is hence obvious that after the element 39 has moved the last tooth 53 to its final position (Figure 7), any further movement of the trigger will cause, upon the return thereof, the member 39 to move to the position at 56 shown by dot-dash lines in Figure 7. The distance moved through to reach this point is of course the same as that through which the member moves during each return operation of the trigger. At the said point 56 there is no tooth, and hence upon the return of the trigger, the element 39 will merely slidably move along the arcuate surface 55 back to its position against tooth 53.

To load the camera, the cylindrical film is inserted into the groove 34 within the holder 33, the walls of said groove serving as retaining members to hold the film in place. The assembly of ratchet wheel and film container is then snapped into place within the camera chamber, the wall 30, acting as a spring detent, yieldably holding the flange 32 in position within the groove 31. The protruding portion of the film extends into the camera chamber and is now in a position, with respect to the apertures 24 and 25, to receive an image passing therethrough upon a movement of the shutter 26. As the recessed portion of the wall 30 is in contact with the entire periphery of the flange 32, a complete light-proof closure is effected.

Each film can be kept in a sealed cylindrical container having a narrow flexible cap portion thereon,—the container being sufficiently small to be kept in a vest pocket. When the film is ready to be loaded, the seal can be removed and the lateral sides of the cap can be slightly pressed between the fingers so that upon a removal of the cap from its engagement with the body of the container, the film will come out with it. At this point the protruding portion can be quickly inserted within groove 34, and then the camera loaded.

Although the means of attachment by the use of the channel member 18 is here illustrated, it is apparent that for other constructions of guns, other securing means can be employed. It is possible to attach the camera, in certain forms of guns, to the portion equivalent to 16 by a ring member clamp made specially therefor; and other means can be employed depending upon the particular design of gun, without departing from the general construction of this apparatus.

If it is desired, the links 47, 48 and 49 can be encased or covered by a thin guard which need not consume very much space.

It should be noted that in positioning the camera underneath muzzle 16 and near the center of the gun, where most of the weight is distributed, there will be less noticeable weight difference than would be the case if the camera portion were attached to the end of member 16. Furthermore, keeping it as far removed rearwardly from the mouth of the gun enables a wider angle of photographic vision to be obtained.

The camera portion of my invention can be made conveniently small, so that it will not prove a detriment either in the operation of the gun, or while it is lodged in a pocket or holster. Due to the advanced state of the science of photography, perfect results can now be obtained with miniature cameras, where the relatively small films can be enlarged to practical sizes. Hence a practical embodiment of my invention can be very compact, without in any way sacrificing its effectiveness. And inasmuch as moving parts of such a small device are necessarily light, there will be no noticeable increase in frictional resistance during the operation of the trigger.

Instead of having the camera attached to an actual gun or revolver, it can be associated with a frame of gun-like structure, having a handle, and a lever analagous to a trigger. In this way the operator can aim the camera gun fashion, sighting the object with an appropriately positioned finder.

This invention is not limited to the specific design herein disclosed and described, as other forms and modifications thereof can be employed within the scope of the appended claims.

What I claim is:—

1. In a camera gun, a camera attached to the gun, a film compartment, a stationary element associated with said compartment and containing a light transmitting portion in registry with the lens opening of the camera, a shutter containing an aperture movable across said light-transmitting portion to expose the film to light entering said lens opening, a trigger operatively connected to the gun, and actuating means connecting the trigger to said shutter whereby a movement of the trigger will cause an operative movement of the shutter.

2. In a camera gun, a camera attached to the gun, a film compartment, a stationary cylindrical member forming the lateral wall of said compartment, said wall containing an aperture in registry with the lens opening of the camera, a cylindrical shutter concentrically positioned with respect to said wall and containing an opening therein, said shutter being rotatable about the axis of said cylindrical wall whereby said opening will be moved across said aperture to expose the film to light entering said lens opening, a trigger operatively connected to the gun and actuating means connecting said trigger to said shutter.

3. In a camera gun, a camera attached to the gun, a film compartment, a stationary cylindrical member forming the lateral wall of said compartment, said wall containing an aperture in registry with the lens opening of the camera, a shutter in slidable engagement with the exterior surface of said wall and containing an opening therein, a projecting element attached to said shutter, a link operatively engageable with said element, a trigger operatively connected to the gun, pivotal connecting means between said link and the trigger whereby a movement of the trigger will cause an operative movement of the shutter, a cylindrical film holder associated with said film compartment, and means to move said film holder a predetermined distance upon the discharge of the gun.

4. In a camera gun, a camera attached to the gun, a film compartment, two stationary concentric cylinders in spaced relation to each other, the inner cylinder forming the lateral wall of said compartment, each of said cylinders having therein an aperture in registry with each other and with the lens opening of the camera, a shutter movably positioned between said cylinders and containing an opening therein, a trigger operatively connected to the gun and actuating means connecting the trigger to said shutter whereby a movement of the trigger will actuate the shutter to carry the opening therein across said apertures.

5. In a camera gun, a camera attached to the gun, a film compartment, two stationary concentric cylinders in spaced relation to each other, the inner cylinder forming the lateral wall of said compartment, each of said cylinders having therein an aperture in registry with each other and with the lens opening of the camera, a cylindrical shutter concentric with and positioned between said cylinders and rotatable about the common axis of the cylinders, said shutter containing an opening therein adapted for registry with said apertures upon a movement of the shutter, a projecting element attached to said shutter, a recess through which said element extends and within which it is movable during the operative rotation of the shutter, a link operatively engageable with said element, a trigger operatively connected to the gun and pivotal connecting means between said link and the trigger whereby a movement of the trigger will cause an operative movement of the shutter.

6. In a camera gun, a camera attached to the gun, a film compartment, a stationary element associated with said compartment containing a light-transmitting portion and in registry with the lens opening of the camera, a shutter containing an aperture movable across said light-transmitting portion to expose the film to light entering said lens opening, a film holder removably and rotatably associated with said film compartment, a trigger operatively connected to the gun actuating means connecting the trigger to said shutter to cause respective forward and return movements of the shutter upon the operation and release of the trigger, and means associated with the shutter and the film holder to rotatably actuate said film holder a predetermined distance upon the return of the shutter.

7. In a camera gun, a camera attached to the gun, a film compartment, a stationary element associated with said compartment and containing a light-transmitting portion in registry with the lens opening of the camera, a shutter containing an aperture movable across said light-transmitting portion to expose the film to light entering said lens opening, a film holder removably and rotatably associated with said film compartment, a trigger operatively connected to the gun actuating means connecting the trigger to said shutter to cause respective forward and return movements of the shutter upon the operation and release of the trigger, a ratchet wheel affixed to the film holder, and a member attached to the shutter and operatively engageable with the teeth on the ratchet wheel to cause a rotation thereof and of the attached film holder upon the return movement of the shutter.

8. In a camera gun, a camera attached to the gun, a film compartment, a stationary element associated with said compartment and containing a light-transmitting portion in registry with the lens opening of the camera, a shutter containing an aperture movable across said light-transmitting portion to expose the film to light entering said lens opening, a cylindrical film holder containing a peripheral recess to retain a film therein, an opening for removably receiving said film holder for cooperative association with said film compartment, a peripheral retaining wall surrounding said latter opening and in yieldable engagement with said film holder, a trigger operatively connected to the gun actuating means connecting the trigger to said shutter, and means cooperatively associated with the shutter and the film holder to rotatably actuate the film holder upon a predetermined movement of the shutter.

9. In a camera gun, a camera attached to the gun, a film compartment, a stationary cylindrical member forming the lateral wall of said compartment, said wall containing an aperture in registry with the lens opening of the camera, a cylindrical shutter concentrically positioned with respect to said wall and containing an opening therein, said shutter being rotatable about the axis of said cylindrical wall whereby said opening will be moved across said aperture to expose the film to light entering said lens opening, a cylindrical film holder containing a circular recess at an end terminal thereof for retaining a film therein, the wall of the camera containing a circular opening, a peripheral retaining wall surrounding said latter opening and in yieldable circumferential engagement with said film holder, said film holder being rotatable about the axis of the said stationary cylindrical member, a ratchet wheel affixed to the film holder, an actuating member attached to the shutter and operatively engageable with the ratchet wheel, a trigger operatively connected to the gun and actuating means connecting the trigger to said shutter.

10. In a camera gun, a camera attached to the gun, a film compartment, a stationary cylindrical member forming the lateral wall of said compartment, said wall containing an aperture in registry with the lens opening of the camera, a cylindrical shutter concentrically positioned with respect to said wall and containing an opening therein, said shutter being rotatable about the axis of said cylindrical wall whereby said opening will be moved across said aperture to expose the film to light entering said lens opening, a film holder having peripheral retaining means thereon for accommodating a cylindrical film, a flanged element associated with and circumferentially positioned about said film holder, the wall of the camera having therein a circular opening, a retaining wall surrounding said circular opening and having an inner circumferential recess therein in yieldable engagement with the periphery of said flanged element, a ratchet wheel affixed to the film holder, a spring member attached to the shutter and operatively engageable with the ratchet wheel to rotatably actuate it and the attached film holder upon a movement of the shutter in a predetermined direction, a trigger operatively connected to the gun and actuating means connecting the trigger to said shutter.

11. In a camera gun, a camera attached to the gun, a film compartment, a stationary element associated with said compartment and containing a light-transmitting portion in registry with the lens opening of the camera, a shutter containing an aperture movable across said light-transmitting portion to expose the film to light entering said lens opening, a film holder removably and rotatably associated with said film compartment, a trigger operatively connected to the gun actuating means connecting the trigger to said shutter to cause respective forward and return movements of the shutter upon the operation and release of the trigger, a ratchet wheel affixed to the film holder and having an operative and an inoperative portion thereon, the operative portion containing a plurality of equally spaced teeth, the inoperative portion extending between the first and last of said teeth and being of greater width than the spaces on the said operative portion; a spring member attached to the shutter and engageable with both of said portions; successive forward movements of the shutter being adapted to carry said spring member through a distance substantially equal to the pitch of the teeth and into operative engaging positions with relation to the teeth on the operative portion of the wheel, and successive return movements of the shutter being adapted to cause said spring member to operatively engage the adjacent teeth to cause intermittent rotary movements of the ratchet wheel and film holder.

12. In a camera gun, a camera attached to the gun, a film compartment, two stationary concentric cylinders in spaced relation to each other, the inner cylinder forming the lateral wall of said compartment, each of said cylinders having therein an aperture in registry with each other and with the lens opening of the camera, a cylindrical shutter concentric with and positioned between said cylinders and rotatable about the common axis of the cylinders, said shutter containing an opening therein adapted for registry with said apertures upon a movement of the shutter, a projecting element attached to said shutter, the outer of said cylinders containing a recess through which said element extends and within which it is movable during the operative rotation of the shutter, a reciprocating link having two abutments thereon, one being operatively engageable with said element upon a forward movement of the link and the other being operative upon the said element in the opposite direction upon a return movement of the link, a trigger operatively connected to the gun and pivotal connecting means between said link and the trigger to cause reciprocal movements of the link upon the operation and release of the trigger.

ABRAHAM KURNICK.